Sept. 1, 1925.
S. F. NICHOLS
1,551,607
TURNTABLE TRACTOR
Filed March 13, 1924   2 Sheets-Sheet 2
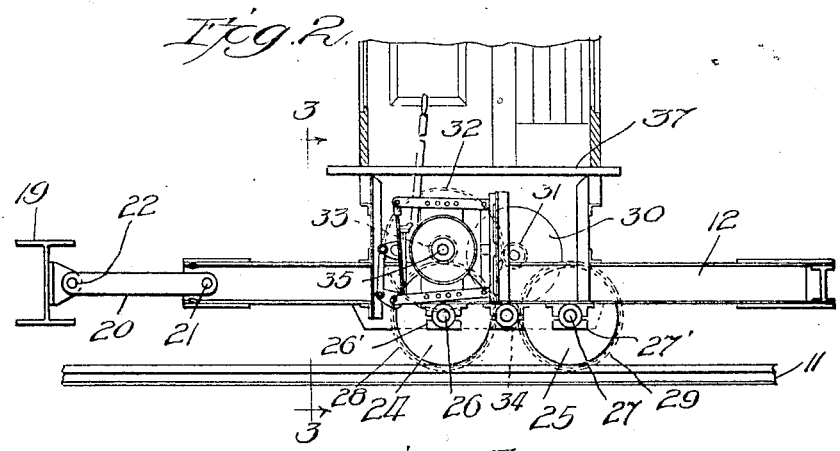
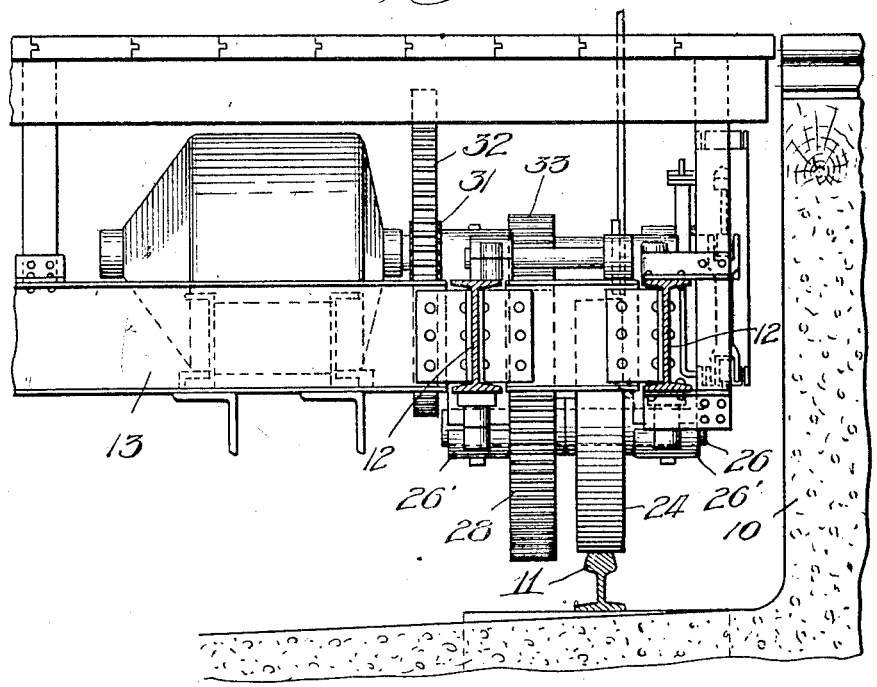
Inventor:
Samuel F. Nichols Patented Sept. 1, 1925.

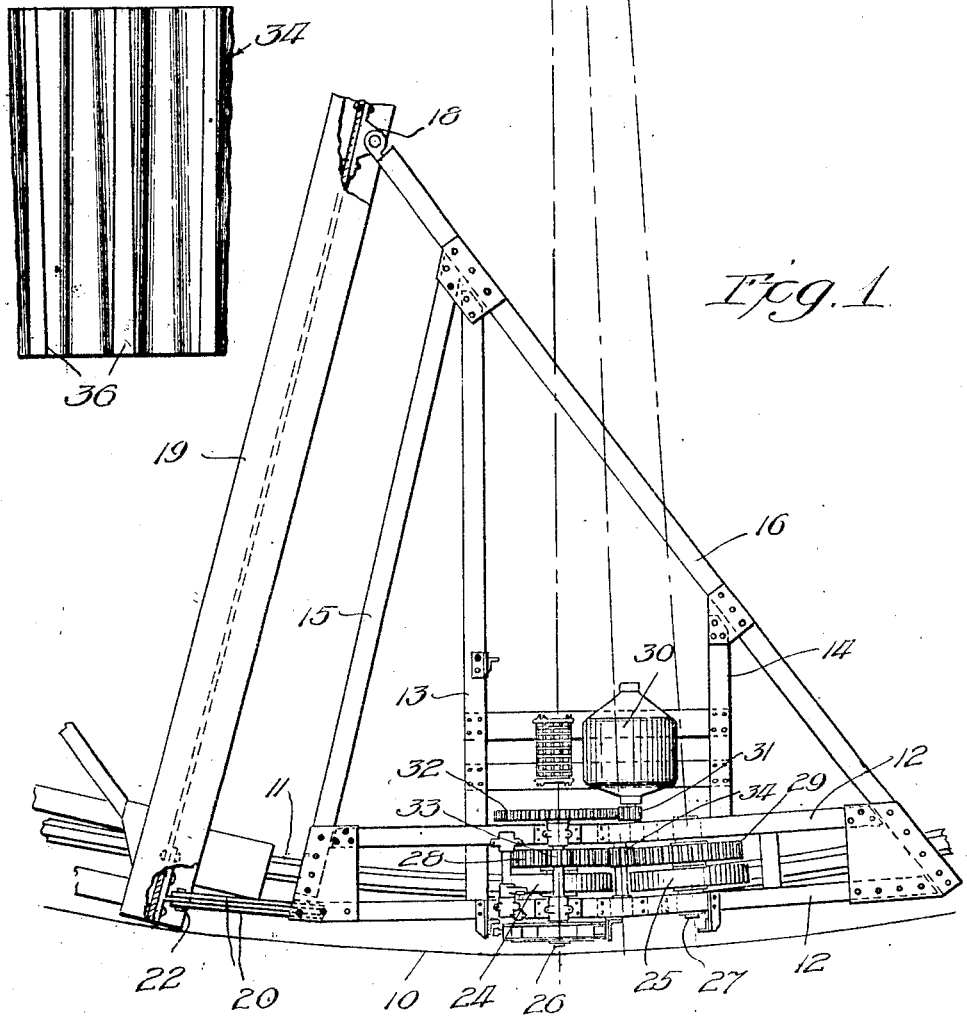
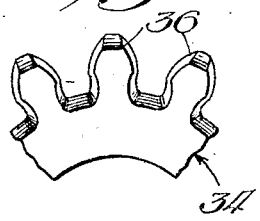

1,551,607

UNITED STATES PATENT OFFICE.

SAMUEL F. NICHOLS, OF CHICAGO, ILLINOIS.

TURNTABLE TRACTOR.

Application filed March 13, 1924. Serial No. 698,924.

*To all whom it may concern:*

Be it known that I, SAMUEL F. NICHOLS, a citizen of the United States, and a resident of Chicago, in the county of Cook and State of Illinois, have invented certain new and useful Improvements in Turntable Tractors; and I do hereby declare that the following is a full, clear, and exact description thereof, reference being had to the accompanying drawings, and to the characters of reference marked thereon, which form a part of this specification.

This invention relates to improvements in tractors for operating turntables, of that general class which is operated in a pit, the tractor traveling and being supported on a circular pit rail near one wall of the pit.

Heretofore it has been proposed to equip such tractors with tandem traction and supporting wheels to operate on the pit rail, but with the wheels disposed in the same plane. This old practice has not been satisfactory because said wheels tend, by reason of their common plane and the fact that they rotate on axes parallel to each other, to travel in a straight path tangent to the circle of the pit rail and thus cause said wheels to slide around against a positive and powerful effort in a different direction. The effects of these counter efforts have been to cause wear on the wheels, gears, hubs and ends of bearings, loss of power and tendency to throw the tractor and turntable out of balance.

A primary object of the invention is to produce a practical and reliable tandem wheel tractor for this purpose, or one supported on traction wheels that travel one in front of the other on the pit rail, and in which the axes of rotation of the traction wheels are so disposed, relatively to each other, as to naturally tend to travel on the true circle of the pit rail, thereby eliminating wear, loss of power, and also reducing undesirable stresses in the tractor frame.

In order to produce this desirable result, it is proposed that the traction wheels be so disposed relatively to the frame of the tractor that the axes of rotation of the tractor wheels shall be radial to the center of the pit. This arrangement of the axes of rotation of the traction wheels disposes said traction wheels in non-coincident intersecting planes, so that the two wheels (or more than two wheels if desired) as viewed from above, assume an angular position relatively to each other which approximates the circle of the pit rail. The tractor may be driven by an electric, gasoline or air motor which may, if desired, be connected to a driving pinion which meshes with gears fixed to the axles of the traction wheels; or the motor, of whatever kind used, may be geared to a gear disposed co-axially of and fixed to and rotating with one of the traction wheels, with an idler or compensating gear interposed between and meshing with said gear and with a like gear of the other traction wheel.

Another object of the invention is to simplify the gear connection between the motor and traction wheels which permits the use of gear wheels of uniform diameter at the traction wheels, regardless of the radius of the pit rail, thus making the driving gearing universal in this respect.

Any suitable draw connection may be employed for connecting the tractor to the turntable so as to permit of relative, vertical movements between said tractor and turntable when rolling stock enters on the turntable and thereby avoid objectionable shocks to the turntable and the driving mechanism therefor, and such also as will stabilize the tractor relatively to the supporting pit rail.

There is shown in the drawing one embodiment of the invention to illustrate the principle thereof and its mode of adaptation to a known form of turntable; but it will be understood that the details of the tractor and its connection to the turntable may be varied within the scope of the appended claims.

As shown in the drawings:

Figure 1 is a plan view of parts of a tractor embodying my invention showing the manner of connecting it to a turntable.

Figure 2 is a side view of the tractor and a portion of the turntable, showing also part of the cab of the tractor.

Figure 3 is a vertical section on an enlarged scale, indicated generally on the line 3—3 of Figure 2, showing the pit wall and an external approach rail.

Figure 4 is an enlarged plan view of a special form of pinion which meshes with the traction wheel gears.

Figure 5 is a fragmentary end view of said pinion.

As shown in said drawings, 10 designates the vertical wall of the pit, and 11 the usual circular pit rail located adjacent to said wall.

The tractor frame is fabricated of suitable commercial shapes, including the longitudinal I-beams 12, 12, connected by gusset plates, and transverse and oblique I-beams 13, 14, 15 and 16 which extend inwardly to constitute a stabilizing and supporting frame which is adapted at its inner end for connection at 18 to the turntable 19 inwardly beyond its outer end.

The tractor is coupled near the wall pit to the outer end of the turntable by rigid links 20 which are pivoted at corresponding ends to a horizontal pin 21 carried by the tractor and are pivoted at their other ends to a horizontal pin 22 carried by the turntable. This connection permits desired vertical and horizontal relative movements of the turntable and tractor to avoid shocks being thrown on the tractor and the machinery carried thereby, due to rolling stock passing onto and off of the turntable.

24, 25 designate traction wheels which are fixed to axles 26, 27 that are supported to rotate in bearings 26′, 27′ fixed to the lower flanges of the beams 12 of the tractor frame. Said traction wheels are supported by and travel on the pit rail. The axles 26, 27 are disposed radially relatively to the center of a circle whose circumference is the pit rail 11, as indicated by the broken lines in Figure 1. This arrangement of the axles of said traction wheels disposes said wheels in non-coincident and intersecting planes and in position to travel freely on the pit rail 11.

28, 29 designate gear wheels which are fixed to and rotate with the axles 26, 27 and are thereby fixed to rotate with the traction wheels. Each of said gear wheels is disposed in a plane parallel to its companion traction wheel. Said gear wheels are driven by a motor 30, herein shown as an electric motor, suitably supported on the tractor frame. Driving power is transmitted through a train of gears, comprising a pinion 31 on the motor shaft, a spur gear 32, a pinion 33 meshing with the gear 28, and an idler or compensating gear 34 which is interposed between and meshes with the gears 28 and 29 and is rotative on an axis radial to the center of said pit rail. Said pinion 33 and the spur gear 32 are fixed to and rotate with a shaft 35 which latter is supported in suitable bearings on the tractor frame.

The gears 28 and 29 may, if desired, be ordinary bevel gears and the pinion 34 may be a bevel pinion, the teeth of which are suitably generated to mesh with said beveled gears. As herein shown and preferably, the said gears 28 and 29 are standard spur gears, and the teeth 36 of the compensating or idler pinion 34 are specially generated, as shown in Figures 4 and 5, to properly mesh with the teeth of said spur gears. If desired, the pinion 34 may be a driving pinion through which power is transmitted to drive the gears 28, 29. Preferably, however, the train of driving gears herein shown is employed for the reason that breakage of said pinion 34 will not put the tractor out of commission, it being practicable to drive the tractor through the rear wheel in an emergency.

From what has been said, and as disclosed in the drawing, it will be apparent that the traction wheels of the tractor freely follow the true circle of the pit rail 11 and that the power, less that expected to overcome the gear train friction, is delivered to the traction wheels and is expended in efficient tractive effort to move the turntable and its load.

An advantage of employing spur gears 28, 29 and an intermediate meshing, compensating or driving pinion is that said spur gears will thus become standard for all diameters of pits, whereas the use of bevel gears would necessitate furnishing gears 28, 29 especially adapted to the radius of the pit rail.

I claim as my invention:

1. A turntable tractor comprising a frame, including an inwardly extending stabilizing and supporting extension adapted for connection at its inner end to a turntable inwardly beyond its end, tandem disposed supporting and traction wheels therefor rotative on axes radial to the center of the circle of a pit rail on which said traction wheels travel and are supported, and a strut link structure pivoted at its ends to said turntable and to the said tractor by means to permit relative vertical movement of said turntable and tractor.

2. A turntable tractor including tandem disposed supporting and traction wheels rotative on axes radial to the center of the circle of a pit rail on which said traction wheels travel and are supported, spur toothed gears fixed to and coaxial with said traction wheels, and a spur pinion having teeth generated to mesh with the spur teeth of said gear wheels and rotative on an axis radial to the center of said pit rail.

3. A turntable tractor comprising a frame, a pair of supporting wheels arranged in relative tandem relation and having their axles converging, a power plant on said frame for rotating said wheels, means for flexibly connecting the rear end of the frame to a turntable, and means extending laterally and rearwardly from that side of the frame at which said axles are nearest to each other for connecting the frame to the turntable to assist said wheels in supporting the frame.

4. A turntable tractor comprising a frame, a pair of supporting wheels arranged in relative tandem relation and having their axles converging, gear wheels fixed to said axles, a compensating pinion meshing with said gear wheels, a motor on said frame, a pinion driven by the motor, and a shaft having thereon a pinion meshing with one of said gear wheels and a gear wheel meshing with the pinion driven by the motor.

In witness whereof I claim the foregoing as my invention, I hereunto append my signature this 7th day of March, 1924.

SAMUEL F. NICHOLS.